US009756844B2

(12) United States Patent
Groeneveld

(10) Patent No.: US 9,756,844 B2
(45) Date of Patent: Sep. 12, 2017

(54) METHOD AND SYSTEM TO MAP BIOLOGICAL PESTS IN AGRICULTURAL FIELDS USING REMOTELY-SENSED DATA FOR FIELD SCOUTING AND TARGETED CHEMICAL APPLICATION

(71) Applicant: HydroBio, Inc, Santa Fe, NM (US)

(72) Inventor: David P. Groeneveld, Santa Fe, NM (US)

(73) Assignee: The Climate Corporation, San Francisco, CA (US)

( * ) Notice: Subject to any disclaimer, the term of this patent is extended or adjusted under 35 U.S.C. 154(b) by 0 days.

(21) Appl. No.: 14/676,687

(22) Filed: Apr. 1, 2015

(65) Prior Publication Data
US 2015/0201605 A1 Jul. 23, 2015

Related U.S. Application Data

(63) Continuation-in-part of application No. 13/455,987, filed on Apr. 25, 2012, now abandoned, and a
(Continued)

(51) Int. Cl.
*A01M 17/00* (2006.01)
*A01G 1/00* (2006.01)
(Continued)

(52) U.S. Cl.
CPC .............. *A01M 17/00* (2013.01); *A01G 1/001* (2013.01); *A01M 17/008* (2013.01);
(Continued)

(58) Field of Classification Search
CPC ........... A01G 1/001; G05D 2201/0201; G05D 1/0274; A01B 79/005; A01B 79/02;
(Continued)

(56) References Cited

U.S. PATENT DOCUMENTS 5,764,879 A 6/1998 Skarpelos et al.
6,212,824 B1 4/2001 Orr et al.
(Continued)

FOREIGN PATENT DOCUMENTS

CA 2837484 12/2012
WO 2012094256 7/2012

OTHER PUBLICATIONS

W.M. Baugh & D.P. Groeneveld, "Broadband vegetation index performance evaluated for a low-cover environment"; International Journal of Remote Sensing, vol. 27, Nos. 21-22, pp. 4715-4730, Nov. 1, 2006; available at www.tandf.co.uk/journals.
(Continued)

*Primary Examiner* — Joshua Huson
(74) *Attorney, Agent, or Firm* — Hickman Palermo Becker Bingham LLP

(57) ABSTRACT

A method for precisely applying chemicals targeted by digital maps developed from remotely sensed data, including: obtaining EOS data through a growing season of a crop growing in a field; processing the EOS data to reflectance values; removing error-inducing effects of atmospheric alteration from the processed EOS data; calculating from the processed EOS data a crop performance index that indicates one or more poor performing areas of the field; generating one or more maps of the crop performance index to allow a user to determine whether each of the one or more poor performing areas of the field are due to biological pests instead of topographic or soil constraints in discrete locations of the field; guiding the user to the one or more poor performing areas of the field using the one or more maps to allow the user to scout the one or more poor performing areas of the field to confirm and identify the biological pests; and providing guidance for a chemical application at the one or more poor performing areas that were confirmed as
(Continued)

having the biological pests. Other embodiments are provided.

20 Claims, 7 Drawing Sheets

Related U.S. Application Data continuation-in-part of application No. 13/455,971, filed on Apr. 25, 2012, now Pat. No. 9,131,642.

(60) Provisional application No. 61/490,499, filed on May 26, 2011, provisional application No. 61/486,193, filed on May 13, 2011, provisional application No. 61/490,499, filed on May 26, 2011, provisional application No. 61/486,193, filed on May 13, 2011, provisional application No. 61/973,757, filed on Apr. 1, 2014.

(51) Int. Cl.
  *G01C 21/00* (2006.01)
  *G05D 1/02* (2006.01)
  *G06T 7/70* (2017.01)

(52) U.S. Cl.
  CPC ............ *G01C 21/00* (2013.01); *G05D 1/0274* (2013.01); *G06T 7/70* (2017.01); *G05D 2201/0201* (2013.01); *G06T 2207/30176* (2013.01)

(58) Field of Classification Search
  CPC ..... A01C 21/00; A01C 21/005; A01C 21/007; A01M 17/00; A01M 17/008; G01C 21/00; G06T 2207/30176; G06T 7/70
  USPC .......................... 47/58.1 SC, DIG. 10; 703/11
  See application file for complete search history.

(56) References Cited

U.S. PATENT DOCUMENTS

| | | | |
|---|---|---|---|
| 6,366,681 | B1 | 4/2002 | Hutchins |
| 6,393,927 | B1 | 5/2002 | Biggs et al. |
| 6,505,146 | B1 | 1/2003 | Blackmer |
| 6,549,852 | B2 | 4/2003 | Hanson |
| 6,947,811 | B2 | 9/2005 | Addink et al. |
| 7,058,197 | B1 | 6/2006 | McGuire et al. |
| 7,068,816 | B1 | 6/2006 | Knoblauch et al. |
| 7,171,912 | B2 | 2/2007 | Fraisse et al. |
| 7,723,660 | B2 | 5/2010 | Holland |
| 9,131,642 | B2 | 9/2015 | Groeneveld |
| 2001/0036295 | A1 | 11/2001 | Hendrickson et al. |
| 2003/0019152 | A1 | 1/2003 | Raun |
| 2004/0236443 | A1 | 11/2004 | Ware et al. |
| 2004/0237394 | A1 | 12/2004 | Mayfield et al. |
| 2005/0165552 | A1 | 7/2005 | Fraisse et al. |
| 2005/0234691 | A1 | 10/2005 | Singh et al. |
| 2006/0161309 | A1 | 7/2006 | Moore et al. |
| 2007/0186830 | A1 | 8/2007 | Fraisse et al. |
| 2008/0097653 | A1 | 4/2008 | Kaprielian et al. |
| 2009/0007485 | A1 | 1/2009 | Holland |
| 2009/0259483 | A1 | 10/2009 | Hendrickson |
| 2009/0326723 | A1 | 12/2009 | Moore et al. |
| 2012/0101784 | A1 | 4/2012 | Lindores et al. |
| 2013/0104455 | A1 | 5/2013 | Groeneveld |
| 2015/0206255 | A1 | 7/2015 | Groeneveld |
| 2016/0180473 | A1 | 6/2016 | Groeneveld |

OTHER PUBLICATIONS

W.M. Baugh & D.P. Groeneveld, "Correcting satellite data to detect vegetation signal for eco-hydrolic analyses"; Journal of Hydrology vol. 344, Issues 1-2, pp. 135-145, Sep. 30, 2007; available at http://elsevier.com/locate/jhydrol;.

W.M. Baugh & D.P. Groeneveld, "Annual groundwater evaporation mapped from single satellite scenes"; Journal of Hydrology vol. 344, issues 1-2, pp. 146-156, Sep. 30, 2007; available at http://elsevier.com/locate/jhydrol;.

Compton Tucker, "Red and Photographic Infrared Linear Combinations for Monitoring Vegetation"; Remote Sensing of Environment 8:127-150, Earth Resources Branch, NASA/Goddard Space Flight Center, Greenbelt, Maryland 20771; Elsevier North Holland Inc.; Aug. 1, 1979.

METHOD AND SYSTEM TO MAP BIOLOGICAL PESTS IN AGRICULTURAL FIELDS USING REMOTELY-SENSED DATA FOR FIELD SCOUTING AND TARGETED CHEMICAL APPLICATION

CROSS-REFERENCE TO RELATED APPLICATIONS

This application is a continuation-in-part of U.S. patent application Ser. No. 13/455,987, filed Apr. 25, 2012, which claims the benefit of U.S. Provisional Application No. 61/490,499, filed May 26, 2011, and U.S. Provisional Application No. 61/486,193, filed May 13, 2011. This application also is a continuation-in-part of U.S. patent application Ser. No. 13/455,971, filed Apr. 25, 2012, which claims the benefit of U.S. Provisional Application No. 61/490,499, filed May 26, 2011, and U.S. Provisional Application No. 61/486, 193, filed May 13, 2011. This application also claims the benefit of U.S. Provisional Application No. 61/973,757, filed Apr. 1, 2014. This application is related to U.S. patent application Ser. No. 14/676,660, filed Apr. 1, 2015. U.S. patent application Ser. Nos. 13/455,987, 13/455,971, and 14/676,660, and U.S. Provisional Application Nos. 61/973, 757, 61/490,499, and 61/486,193 are incorporated herein by reference in their entirety.

TECHNICAL FIELD

This disclosure relates generally to chemical application for agriculture and more specifically to precision application of chemicals targeted by digital maps developed from remotely sensed data.

BACKGROUND

Crop problems are generally found and identified through field scouting, which is often performed on foot. Such crop problems may be caused by various physical limitation of the soil (e.g., sandy soil and/or low water holding capacity), various chemical limitations (e.g., soil sodicity, high pH (power of hydrogen)), or various biological pest that may be attacking the crop. Biological pests, including insects, mites, fungi, bacteria, etc., are potentially the most immediate threat to a crop because impacts to crop health may multiply quickly and, if unchecked, threaten crop yields. While field scouting is effective for areas recently visited, in practice, the long repeat times between visits render the typical scouting of many thousands of acres per season ineffective at quickly disclosing pests. This ineffectiveness can result in yield losses that spread within affected fields, and can enhance the potential infection of other fields.

Once a biological pest is identified, treatment can take place by application of corrective chemicals, for example fungicide, insecticide, etc. applied by various means, but commonly by spraying the crop canopy. Scouting identifies the problem and the chemical solution required. Treatment is typically made on the entire field, or very large sections, thereof. The chemical treatment is typically applied by spray application systems mounted on ground or aerial vehicles that apply the chemical to the field through linear parallel patterns designed to completely cover the field, or large portions thereof. Such blanket use of chemicals can be wasteful, expensive, and environmentally harmful, as such chemicals are often highly toxic.

BRIEF DESCRIPTION OF THE DRAWINGS

To facilitate further description of the embodiments, the following drawings are provided in which.

Figure 1:
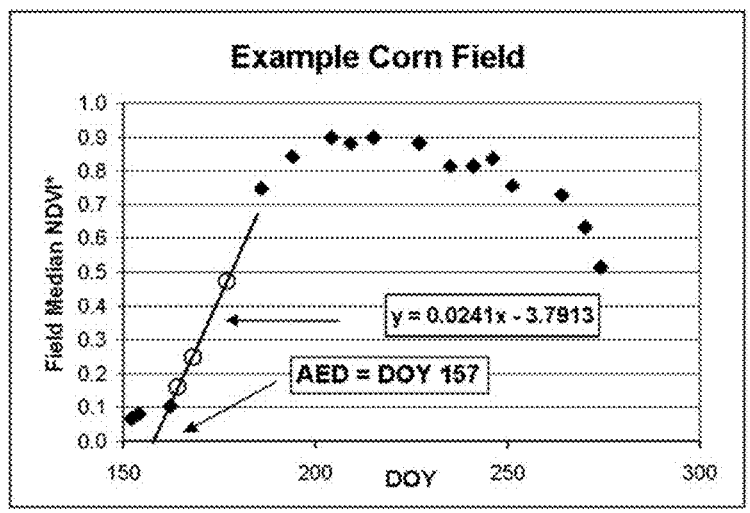
FIG. 1 illustrates a chart showing representative median values for NDVI* from serial images that were extracted for an example corn field plotted by the corresponding day of year.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments can include a method for precisely applying chemicals targeted by digital maps developed from remotely sensed data. The method can include obtaining EOS data through a growing season of a crop growing in a field. The method also can include processing the EOS data to reflectance values. The method additionally can include removing error-inducing effects of atmospheric alteration from the processed EOS data. The method further can include calculating from the processed EOS data a crop performance index that indicates one or more poor performing areas of the field. The method additionally can include generating one or more maps of the crop performance index to allow a user to determine whether each of the one or more poor performing areas of the field are due to biological pests instead of topographic or soil constraints in discrete locations of the field. The method further can include guiding the user to the one or more poor performing areas of the field using the one or more maps to allow the user to scout the one or more poor performing areas of the field to confirm and identify the biological pests. The method additionally can include providing guidance for a chemical application at the one or more poor performing areas that were confirmed as having the biological pests.

Several embodiments can include a system for precisely applying chemicals targeted by digital maps developed from remotely sensed data. The system can include one or more processing modules and one or more non-transitory memory storage modules storing computing instructions configured to run on the one or more processing modules and perform one or more acts. The one or more acts can include obtaining EOS data through a growing season of a crop growing in a field. The one or more acts also can include processing the EOS data to reflectance values. The one or more acts additionally can include removing error-inducing effects of atmospheric alteration from the processed EOS data. The one or more acts further can include calculating from the processed EOS data a crop performance index that indicates one or more poor performing areas of the field. The one or more acts additionally can include generating one or more maps of the crop performance index to allow a user to determine whether each of the one or more poor performing areas of the field are due to biological pests instead of topographic or soil constraints in discrete locations of the field. The one or more acts further can include guiding the user to the one or more poor performing areas of the field using the one or more maps to allow the user to scout the one or more poor performing areas of the field to confirm and identify the biological pests. The one or more acts additionally can include providing guidance for a chemical application at the one or more poor performing areas that were confirmed as having the biological pests.

In a number of embodiments, the systems and method described herein can use visual and near infrared bands of Earth observation satellite data to identify sub-field regions of poor crop performance from biological pests using digital maps for scouting and then guiding chemical application for their control. This application can employ band balancing methods to remove the variability induced through variable atmospheric aerosols. An index can be calculated from three or more of the bands that is sensitive to crop health. Statistical methods can be used to isolate and track locations that are performing poorly, and the resulting digital maps can be used for scouting the field to identify the pest and to target the chemical application for control. The methods can be appropriate once the crop canopy has closed, which can start the period when crop pests readily reproduce and spread. A clocking function using EOS data can be used to forecast when it becomes appropriate to develop and supply the digital maps.

In a number of embodiments, systems and/or methods can provide updated digital maps that can show places in the field that are falling behind in growth and vigor. Digital maps can provide targets for scouting within each of many fields. A two part method can be provided that first targets affected areas for scouting as early as possible and then provides a map to target the chemical application. This process can be rapid, accurate and robust. Through these systems and/or methods, chemical applications can be conserved and so work to enhance profits from the field while protecting the environment and public health. The systems and methods provided can be denoted as targeted chemical management (TCM).

Conventional approaches have concentrated upon spray devices, how they work, and the material additives for sprays that cause biocides to stick to leaves to kill insect eggs and larvae. Another emphasis in conventional approached has been methods to identify spray targets with optical devices mounted to equipment so that, as it passes through a cultivated field, the chemical solution is sprayed once the agent of interest is identified. Conventional approaches do not address how to target field scouting for prior-identified problem locations in the field or how to then map such problems rapidly and efficiently to guide chemical application.

In conventional approaches, if a crop problem of a biological pest is discovered by field scouting, a chemical application would generally be mobilized over the entire field. This blanked chemical application is generally done whether or not the biological pest is present in locations outside of those found during field scouting. The systems and methods described herein can first guide field scouting and then guide chemical application so that only those portions of the field impacted by biological pests can be treated. Using Earth observation satellite (EOS) data can advantageously allow (1) assessment of entire fields, many thousands of fields at a time, (2) mapping field problems for scouting, and (3) applying such maps to target chemical treatment of the problem. EOS platforms for image data collection can include orbital satellites and/or can include manned and/or unmanned aerial vehicles operating within the atmosphere.

In many embodiments, EOS data, especially EOS data from orbital satellites, can need to be corrected to remove light scattering and attenuation effects caused by atmospheric aerosols. Atmospheric aerosols commonly contain admixtures of smoke, dust, water droplets, ice particles, and pollen that affect reflectance values of each band due to backscatter and attenuation of light so that the reflectance at the satellite is variably altered from the actual condition on the ground. For application of remotely sensed data for precision agriculture, high accuracy is desirable, and so these confounding atmospheric effects can need to be corrected for each of the bands of light measured by EOS sensors. Without such correction, unacceptable measurement errors can be introduced by atmospheric influences, especially for comparison from one date to the next. In several embodiments, early detection and tracking of crop problems can benefit from such correction.

EOS platforms suitable for precision agricultural application, such as TCM, can include collection of near infrared (NIR) and a suite of one or more other bands, all within the visual and near infrared portion (VNIR) from approximately 0.35 µm (micrometer) to about 0.9 µm of the electromagnetic spectrum. A band can refer to the broad swaths of wavelengths of light that are measured by the sensors. For example, on the longest operating EOS platform, Landsat TM5, the green band evaluated light in the spectral region of approximately 0.52 µm to approximately 0.60 µm, red band in the region of approximately 0.63 µm to approximately 0.69 µm and NIR from approximately 0.76 µm to approximately 0.9 µm.

"Index" can refer to combinations of EOS bands that are used to determine some measurable property of interest on the Earth's surface. For example the normalized difference vegetation index (NDVI) is the most commonly used vegetation index to measure the plant vigor within each pixel of an EOS scene. NDVI is dimensionless and can be calculated from the combination of the red and NIR bands.

EOS sensor packages can include NIR and at least one red band and one green band. One or more blue bands and an additional red band can be included in the sensor packages carried aboard EOS platforms appropriate for use in precision agriculture, such as with a resolution providing multiple pixels per acre. Atmospheric scatter and attenuation can affect each of these bands differently, which can necessitate performing some form of correction. Otherwise, an index that is formed through mathematical combination of uncorrected individual bands can be unstable through time and can tend to increase and decrease in magnitude in response to the aerosol content between the satellite and the Earth's surface, thus confounding the signal from the crop. For detection of effects from pests in a cropped field, such variability can be especially problematic because the apparent problem may appear and disappear in alternate images, thereby confounding any clear signal.

In its role for early detection of field problems, an appropriate vegetation index for TCM can have the highest possible precision to enable two critical functions: (1) early detection, and (2) accurate inter-comparison among EOS snapshots in order to follow the progression of a growing problem. High precision sensing, along with the Internet and the vast remote sensing scale can advantageously permit serving a huge market at very low individual cost, which can maximize the beneficial impact of this technology.

The systems and methods described herein can use a three-part process to identify and treat locations that are problematic on a cultivated field. In many embodiments, the first part can correct for the signal altering effects of the atmosphere that arise through scatter and attenuation from the interaction of light with aerosols. Aerosol contents in the atmosphere may differ greatly from one day to the next. Atmospheric correction can beneficially correct for correct for these signal-altering effects.

In several embodiments, the second part can be the preparation of an index for TCM that can discriminate problematic locations in a field. This TCM index can be derived in a manner that combines the information from each band, and can enhance any differences between locations in the field that are doing well and those locations that are doing poorly.

In various embodiments, the third part can be to present a digital map to guide field scouting to determine the problem. The digital map can then be updated to guide chemical application on the field only to those areas that are subject to a crop problem, such as being attacked by biological pest.

Band Balancing for Atmospheric Correction

Various methods can be used for correcting EOS data to remove atmospheric effects. For each of these methods, in several embodiments, the first part can be to calculate reflectance in each band. Reflectance is the ratio of the outgoing light from the incoming solar radiation that corrects for changes in solar radiation due to distance and incident angle that change seasonally. Conventional methods for calculating reflectance from satellite data can be used. Satellite data is generally delivered with the mathematical inputs that can be used for calculation of reflectance.

The VNIR spectral region can contain the information necessary for detecting problems within cropped fields. Generally, there are from three to five different bands provided by current commercial EOS platforms. Each of these bands can include pertinent information for detection of crop problems. Of the possible EOS bands within the VNIR region, those bands measuring within the NIR wavelengths are the most resistant to atmospheric affects and, hence, the NIR band can be the band of choice for atmospheric correction with all other bands corrected to it. It can be appreciated that an index with the precision to drive TCM can be constructed not to represent some absolute property, for example, reflectance of the target. Rather, in a number of embodiments, a TCM index can be constructed to differentiate between good and poor performing locations within a field. Hence, correcting the bands relative to NIR can be appropriate and can involve using mathematical approaches that represent relative properties that are useful for discriminating good performing from poor performing portions of cropped fields.

In many embodiments, all VNIR bands can be appropriate for use in the TCM index. In a number of embodiments, the TCM index can include at least three bands: NIR, red and green. Increasing the number of bands available can increase the sensitivity of the potential discrimination power of the TCM index, as the responses in each band can be used to drive better discrimination of problem areas from the good performing portions in cropped fields.

Conventional approaches to correcting the EOS bands to remove atmospheric influences can be inadequate for use in calculating the TCM index, either due to lack of sensitivity for correcting one or more VNIR bands, or because they lack the potential for automation. The TCM index can use a method called "band balancing" that can beneficially account for the fact that each band can be affected differently by atmospheric aerosols.

In several embodiments, band balancing can begin by determining a least percentage of each band's frequency distribution, for example at approximately 2%. For this operation, bodies of water can be first masked from consideration in the scene to be corrected. Removal of water bodies can be performed because the amount of exposed water in any scene or area of interest can be highly variable, perhaps forming a majority of, or even greatly exceeding, the least 2% level. Water bodies can be readily and conclusively identified if the EOS dataset contains the water-absorption short wave infrared (SWIR) band. SWIR response for water is extremely low reflectance that is generally around zero because the water absorbs the light. Non water targets can have much higher values. In the SWIR band, water can be identified and masked using a simple threshold value that is around zero.

In several embodiments, if the EOS data to be used for TCM does not have a SWIR band, water can be eliminated from the calculations using the NIR band, that similarly has very low reflectance, though generally from approximately 0.02 to approximately 0.07, these values being variable and elevated due to atmospheric backscatter and potentially due to reflective particles entrained in the water. Like the SWIR band, thresholds of low NIR values can be used to identify and remove water bodies from consideration during the band balancing calculations. Since NIR values for vegetated targets are relatively high magnitude, the method effectively does not remove cropped landscapes from the calculation. Once pixels of water bodies are identified, they are masked from consideration in all of the available bands.

In a number of embodiments, the band balancing technique can obtain the reflectance value for all VNIR bands at the lowest 2% of the distribution once water bodies are removed. The values of all bands at the least 2%, the "min" value, can be designated $NIR_{min}$, $Red_{min}$, etc., and a generic representation of all visual (non-NIR) bands can be designated as $Band_{min}$. For deriving the calibration for each EOS platform, pixel values can be extracted and frequencies can be analyzed to choose the $Band_{min}$ values for each VNIR band using multiple sets of archived EOS data.

In various embodiments, for each EOS dataset, $NIR_{min}$ can be scaled to give more sensitivity for the band balancing calculations by choosing some value that will be higher than the $NIR_{min}$ value, then subtracting the $NIR_{min}$ from it. This constant can be designated z. Equation 1 represents this operation for each of the EOS datasets.

$$NIR_{res\ d} = z - NIR_{min\ d} \quad \text{(Equation 1)},$$

where the subscripts res and d represent residual and dataset for each EOS overpass.

In several embodiments, the other $Band_{min}$ values from each of the EOS datasets can then be regressed upon their paired values of $NIR_{res}$ to derive correction factors for each $i^{th}$ pixel. These take the form of Equation 2 calculated to derive a correction value, $Band_{corr}$, for correcting each EOS dataset.

$$Band_{corr} = mNIR_{res} + b \quad \text{(Equation 2)},$$

where m is the slope of the regression relationship and b is the intercept.

In many embodiments, the $Band_{res}$ correction can be derived in Equation 2 to produce a constant that is then added to each pixel value of the appropriate band as in Equation 3 resulting in adjusted values. Calculating the adjusted values can complete the first part for calculating the TCM index of removing the confounding atmospheric effects in EOS data.

$$Band_{adj\ i} = Band_{corr} + Band_i \quad \text{(Equation 3)},$$

where adj indicates the adjusted value that is added to the $i^{th}$ pixel of the chosen band.

Calculating the TCM Index from the Band Balanced EOS Data

In a number of embodiments, once band balancing has been completed for the EOS dataset, the TCM index can be calculated. Although band balancing can be calculated for all pixels across the full EOS dataset to correct for atmospheric spectral distortion, the TCM index can be calculated for each cropped field of interest. The statistical focus on individual fields can automatically calibrate for the conditions specific to each field. For example, different crops, different development stage of the crop, and/or different overall health of the field can produce variable magnitude of index responses when measured at any point in time.

In some embodiments, the first part in calculation of the TCM index can be mathematical extraction of the per pixel values within the field of interest, which can be designated Field m. The Field m values can be analyzed statistically to determine the maximal NIR and the minimal values for the visual bands. An index can then calculated for each NIR in Field m:

$$NIR_m = (NIR_{m\text{-}max} - NIR_{adj})/NIR_{m\text{-}max} \quad \text{(Equation 4)},$$

where m denotes the field of interest and max indicates the maximal value measured.

In many embodiments, a visual index can then be calculated for each pixel in the field. Equation 5 presents an example calculation for the simplest case using only two bands, Red and Green:

$$Red\text{-}Green_m = (Red_{m\ adj} * Green_{m\ adj}) / (Red_{m\text{-}min} * Green_{m\text{-}min}) \quad \text{(Equation 5)},$$

where the adjusted values are from Equation 3 for Field m and min is the minimal value measured in Field m for red and green.

In several embodiments, the TCM index K can then be calculated in Equation 6, which is presented here for the simple case of 3 bands (NIR, red, and green) that can be performed for every pixel in Field m.

$$K_{TCM} = NIR_m + Red\text{-}Green_m \quad \text{(Equation 6)},$$

where $K_{TCM}$ is the abbreviation of TCM index.

In a number of embodiments, the final part in $K_{TCM}$ can be to normalize the results so that this index displays positive values for locations doing well and negative values for portions of the field doing less well. This calculation, Equation 7, can use either the median or the average value of $K_{TCM}$. The median can provide a more robust measure, especially in fields with a large numbers of pixels.

$$K_{TCM\text{-}norm} = (K_{TCM\ med} - K_{TCM})/K_{TCM\ med} \quad \text{(Equation 7)},$$

where subscripts norm, med and i refer to normalized, median and $i^{th}$ pixel of Field m.

Display and Flagging for Field Scouting

In several embodiments, the calculations of $K_{TCM}$ can provide an update at every satellite overpass on which Field m is clear of clouds and cloud shadows. The updates can provide valuable overview to detect and evaluate any problem that may be occurring. Although this detection can include detecting biologic pests for chemical action, this detection also can include detrimental crop changes for other reasons. An example following heavy rain are contour furrow swales created to prevent runoff and erosion, which can fill with water and drown, or retard a crop planted in them. Such poor locations can readily show up in $K_{TCM}$, but are due to topography and are non-actionable.

High-resolution digital air photography, such as clipped images from the National Agricultural Imagery Program (NAIP), can be presented as a base image with overlain $K_{TCM}$ results that can be toggled on and off to enable comparison with topographic features in the field that can enable discrimination of problems related to topography from those resulting from biological pests. In some cases, high-resolution can be 5 meters or less. In other cases, high-resolution can be 1 meter or less. Because scouting is time-expensive, enabling discrimination of non-actionable problems from biological pests can beneficially facilitate operational use of the systems and methods described herein. In terms of severity, small areas of crops drowned in contour furrow swales can be a small loss compared to an unchecked biological pest that can rapidly multiply, destroy the entire yield of Field m, and spread to adjoining fields. In many embodiments, the systems and methods described herein can include flagging to alert the user that areas of Field m are falling behind. For example, the flagging can be triggered by a percent decrease relative to the remainder of the field. Such flagging can be calibrated for the region of interest and the crops being grown.

In various embodiments, each $K_{TCM}$ update can provides the user with a potential scouting map. Areas of Field m that are falling behind the remainder of the field due to non-actionable and known topographic or soils-related features well known to the farmer can first be discriminated by observation in comparison to the NAIP imagery. Against this rational comparison, locations that fall behind the remainder of the field due to damage inflicted by a biological pest can be readily discriminated.

In operational use for scouting, the user, such as a farmer, can take the $K_{TCM}$ map into the field in an app on a hand-held device, such as a tablet or smartphone, equipped with global positioning system (GPS). For example, the device can be similar to device 7000 (FIG. 7), described below. In several embodiments, the app can guide the user to the exact location of the poorly performing area to identify the biological pest and then to plan the necessary chemical control.

Digital Map Development for Field Application

The problem of biological pests can benefit from rapid treatment because their populations, whether insects, fungus, bacteria, etc. typically increase exponentially over time. Thus, once scouted and identified, the prudent farmer wastes no time in planning and executing chemical application, as time is of the essence. The amount of time between scouting identification and chemical application, called the elapsed execution period, can be taken into consideration in determining how the maps are generated and used. With the elapsed execution period being on the order of approximately ten days, or less, in several embodiments, the map to guide chemical application can be the areas identified on the most recent $K_{TCM}$ map used for scouting with a daily increase in the area to be treated to accommodate the growth and expansion of the pest. Such radial expansion can be readily performed in a number of embodiments by computer and the added area can be called a buffer. The width of the buffer added can be dependent upon the biological pest, and that the rate of buffer expansion can be variable depending upon the pest, the temperature, and the humidity. In several embodiments, each pest and crop can benefit from calibration for the most accurate determination for the buffer size and rate of growth.

A challenge can be accommodation of locations where the crop may be impacted by the effects of topography rather than due to the biological pest. Examples of such non-pest impacts can include the aforementioned crop drowned within a contour furrow swale following high rainfall. Other topographic factors can include: (1) south-facing slopes that are more drought prone through enhanced evaporation through greater insolation, (2) reduction in rainfall per unit area because the surface is slanted, and especially (3) enhanced runoff that reduces rainfall capture for soil infiltration.

Poor soils are an additional factor that may constrain crop growth. For example, an area of sandy or gravelly soil within the field that has low water and nutrient holding capacity can constrain crop growth. In many embodiments, soil- or topographically-induced areas constraining crop performance can be highlighted by the $K_{TCM}$ index because they do not perform as well as the remaining parts of the field. In several embodiments, erroneous perceptions of crop problems in these zones can be eliminated by performing change detection that takes the most recent $K_{TCM}$ map and subtracts the spatially correct pixel values of $K_{TCM}$ measured in the previous EOS data. Change detection can beneficially provide a map of values that are highly positive for locations that are growing well, near zero for those locations that are approximately average, and negative for those locations that are actually slipping backward. Both the updated map of $K_{TCM}$ and the change detection map of $K_{TCM}$ can provide instantaneous measures that the user can evaluate to detect and track problems on Field m.

TCM can be part of a suite of precision agronomic tools that include the use the vegetation index NDVI* that is stretched so that zero NDVI* is a surface bare of vegetation while NDVI* of one is a theoretic peak value. The remotely-sensed measure of yield variability can be determined using a vegetation index, NDVI*, which can be calibrated to remove confounding effects from the soil background and atmospheric effects. The resulting timed NDVI* map can provide a surrogate for relative yield that is used to scale the application density of the desired input. The remotely sensed index, NDVI*, can use the red and near infrared bands of light for scaling plant activity.

NDVI* can provide a scalar to estimate crop irrigation requirements, optimal amendment requirements, and optimal seeding density. NDVI* uses the red and NIR bands for calculation first of NDVI (Equation 8). Scene statistics can then be used for the stretching calculation that yields NDVI* (Equation 9). Both NDVI and NDVI* can be calculated for the entire scene.

$$NDVI = (Red - NIR)/(Red + NIR) \quad \text{(Equation 8)},$$

$$NDVI^* = (NDVI_i - NDVI_0)/(NDVI_S - NDVI_0) \quad \text{(Equation 9)},$$

where i is the $i^{th}$ pixel, and the subscripts S and 0 are scene statistics for NDVI at saturation and for bare soil.

In many embodiments, NDVI* can be used to determine when to begin the analysis of $K_{TCM}$ for Field m. For example, it can be inappropriate to use the TCM analysis early in the growth of the crops when patterns of emergence and crop establishment depend upon soil temperature and may appear more or less random throughout the field. Under these early conditions, $K_{TCM}$ results can be invalid and/or can be misleading. Turning to the drawings, FIG. 1 illustrates a chart showing representative median values for NDVI* from serial images that were extracted for an example corn field plotted by the corresponding day of year (DOY). A linear growth phase is expressed by NDVI* in FIG. 1 that is common to virtually all allometric relationships such as weight or height per time for virtually all organisms.

The linear portion of FIG. 1 is where the growth of the crop is no longer constrained by temperature and many parts of the crop are growing rapidly and potentially at different rates. Differential growth throughout the fields depends upon spatially-variable water and nutrient availability as well as soil temperature. Even though the median values displayed in FIG. 1 reflect a straight line trend, widely differing rates of growth around the field prevent accurate use of $K_{TCM}$ maps until canopy closure occurs. These early stages of crop growth are also a time when the individual plants are far apart and the threat of biological pests is relatively low because of the spacing between plants. Analysis provided by the systems and methods described herein is thus not a serious need until canopy closure occurs. Canopy closure is when the individual crop plants grow together to form complete leaf cover exposed to the nadir view.

As shown in FIG. 1, NDVI* ends the linear growth phase to form a plateau, which occurs at canopy closure. After crop canopy closure, accurate analysis of $K_{TCM}$ can begin and can be advantageous. After canopy closure, biological pests find the best conditions for growth and expansion because the crop plants are crowded and the environment within the canopy remains protected from wind and attendant swings of humidity and temperature. These conditions are conducive for reproduction and spread of biological pests.

In many embodiments, a method called the clocking function can collect the values of NDVI during the linear growth phase and performs linear regression on these reserved data values. This linear regression line is shown on FIG. 1 as the line through the open circle points that were used for the regression calculation. Solving for y=0, representing conditions with zero crop cover, results in an indexed value that represents an initiation point for the crop that is called the apparent emergence date (AED). Calibration for the elapsed days from AED can be used to forecast when canopy closure will occur and when generation of accurate $K_{TCM}$ maps and map derivatives can begin.

Figure 2:
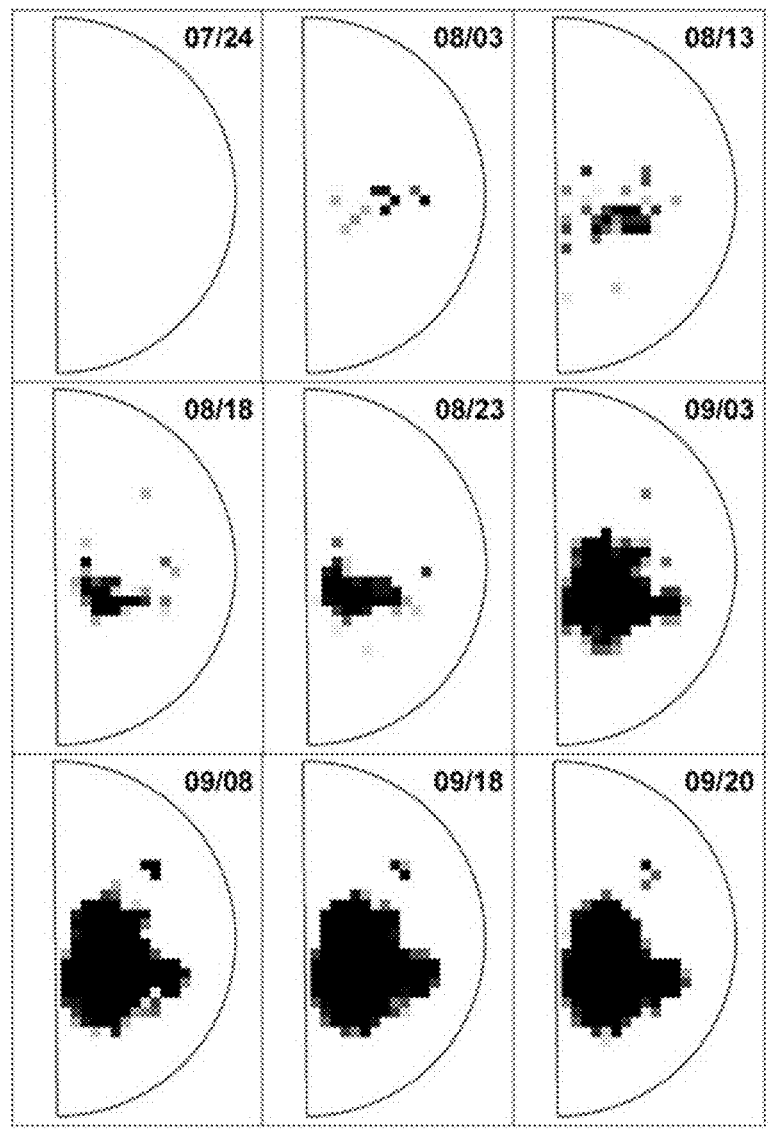
FIG. 2 illustrates an exemplary representation of cumulative $K_{TCM}$ change detection maps in a field of corn affected by a bacterial disease.

Although the instantaneous digital maps for $K_{TCM}$ and $K_{TCM}$ change detection are beneficial to the user, they can be less useful for scouting and guiding chemical application, because $K_{TCM}$ updates can include areas of Field m where the crop is constrained by non-pest influence such as topographic effects or poor soils that may mask the effects of biological pests. Additionally, the $K_{TCM}$ change detection maps can show rapid changes to parts of fields, but those locations that already suffered loss of vigor and that did not recover in subsequent images will not be highlighted further because no further degradation occurred. In several embodiments, a solution is to provide a digital map derived as a cumulative representation of the $K_{TCM}$ change detection maps. Turning ahead in the drawings, FIG. 2 illustrates an exemplary representation of cumulative $K_{TCM}$ change detection maps in 22-meter pixels for a 62 acre, half-irrigation of corn affected by a bacterial disease. The cumulative $K_{TCM}$ change detection maps shown in FIG. 2 are merely exemplary, and embodiments of the cumulative $K_{TCM}$ change detection maps are not limited to the embodiments presented herein. The systems and method provided can be employed in many different embodiments or examples not specifically depicted or described herein. The cumulative $K_{TCM}$ change detection map, such as shown in FIG. 2, can be the change detection results for each past snapshot added together. The cumulative $K_{TCM}$ change detection can be a more certain output to map those areas of the field that suffered serious decline that grew in extent over time.

All three digital products, $K_{TCM}$, $K_{TCM}$ change detection and cumulative $K_{TCM}$ change detection potentially have value for the user and, in some embodiments, all three products can be provided. Alternatively, in some embodiments, subsets of these products can be provided. The digital tool for cumulative $K_{TCM}$ change detection, as shown in FIG. 2, can be used to guide scouting and chemical application on Field m.

The need to provide a digital map product to be used for scouting and chemical application can be balanced against the need for early detection of biological pest activity. In several embodiments, including optional products with the cumulative $K_{TCM}$ change detection in the form of either or both maps of $K_{TCM}$ and $K_{TCM}$ change detection can provide displays that are closer to real time to alert the user to pay attention to subsequent EOS updates for confirmation that would mobilize field scouting. Depending upon the crop, the region, and the types of biological pests that can be encountered, various products can be provided or omitted, with output that can be enhanced to provide the effective information with the least amount of potential confusion for the user. For example, various embodiments can include the output for scouting and chemical application, the cumulative $K_{TCM}$ change detection combined with the potential presentation of products derived from $K_{TCM}$ and $K_{TCM}$ change detection that are optimized for the cropping system. A cropping system can be designated based on: (1) a discreet region, (2) a crop type, (3) a biological pest, and (4) crop cultivation methods.

Flow Charts

Figure 3:
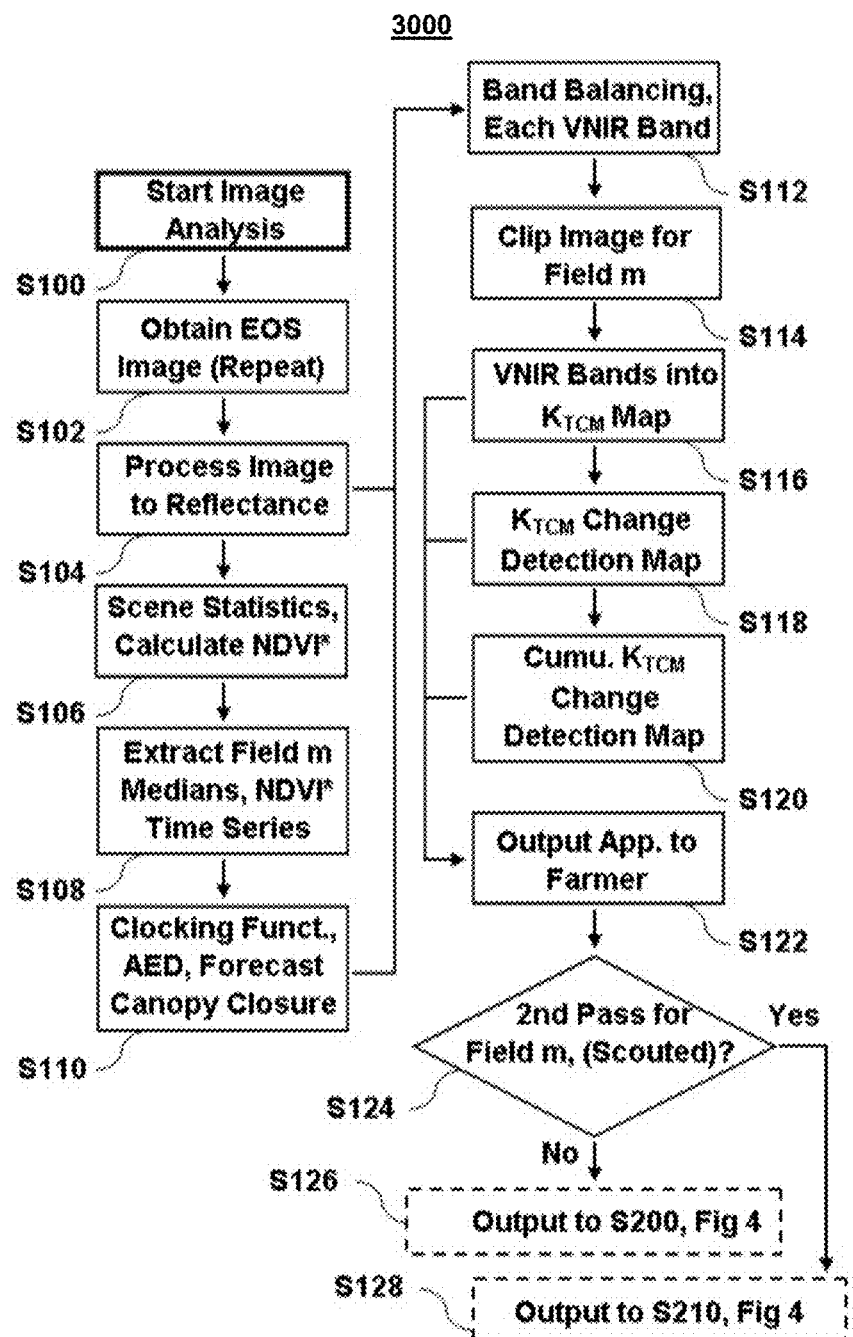
FIG. 3 illustrates a flow chart for a method of image analysis for biological pest problem detection, according to an embodiment.

Turning ahead in the drawings, FIG. 3 illustrates a flow chart for a method 3000 of image analysis for biological pest problem detection, according to an embodiment. Method 3000 is merely exemplary and is not limited to the embodiments presented herein. Method 3000 can be employed in many different embodiments or examples not specifically depicted or described herein. In some embodiments, the procedures, the processes, and/or the activities of method 3000 can be performed in the order presented. In other embodiments, the procedures, the processes, and/or the activities of method 3000 can be performed in any suitable order. In still other embodiments, one or more of the procedures, the processes, and/or the activities of method 3000 can be combined or skipped. Referring to FIG. 3, method 3000 of image analysis can begin at a block S100 of starting image analysis.

In a number of embodiments, method 3000 next can include a block S102 of obtaining EOS images. In several embodiments, the process of obtaining EOS images can be repeated through the growing season.

In several embodiments, method 3000 next can include a block S104 of processing the images to reflectance values. For example, the EOS data can be processed to reflectance values using conventional methods. In a number of embodiments, the EOS data can be processed through a first third of the growing season to determine NDVI and NDVI*.

In many embodiments, method 3000 next can include a block S106 of extracting scene statistics and calculating NDVI* for the scene. For example, the scene statistics can be used to calculate NDVI*, as provided above in Equation 9.

In various embodiments, method 3000 next can include a block S108 of extracting and determining Field m medians from NDVI* time series images. For example, the Field m medians can be similar to the medians plotted in FIG. 1 based on the DOY.

In a number of embodiments, method 3000 next can include a block S110 of entering the Field m medians into the clocking function to forecast AED and when canopy closure will occur. For example, the AED and can be similar to the AED shown in FIG. 1, and the canopy closure can be similar to the when the linear growth phase forms a plateau in FIG. 1.

In various embodiments, method 3000 can continue when canopy closure has occurred to start processing data for evaluating location in Field m that may be impacted by biological pests. For example, method 3000 next can include a block S112 of performing band balancing on the reflectance data from block S104 from the multiple EOS datasets at S102. For example, the band balancing can be performed on each VNIR band. Band balancing can remove the variable spectral effects of atmospheric aerosol content.

In several embodiments, method 3000 next can include a block S114 of clipping the balanced band data to the boundaries of Field M.

In many embodiments, method 3000 next can include a block S116 of calculating $K_{TCM}$ using the balanced band data of Field M.

In some embodiments, method 3000 next can include a block S118 of calculating change detection for Field m. For example, change detection can be calculated for the current image versus the previous image.

In a number of embodiments, method 3000 next can include a block S120 of calculating the cumulative $K_{TCM}$ change detection for Field m.

In various embodiments, method 3000 next can include a block S122 of outputting the digital maps to the user (e.g., a farmer). For example, the digital maps, such as those created in blocks S116, S118, and/or S120, can be output using an app on a mobile device. These digital maps can be used to enable evaluation of locations that may be experiencing problems due to biological pests. In some embodiments, the one or digital maps can include at least one of crop performance index ($K_{TCM}$) maps, crop performance index ($K_{TCM}$) change detection maps, or cumulative crop performance index ($K_{TCM}$) change detection maps If deleterious effects of a biological pest are present are detect in Field m, method 3000 can proceed past block S122. In several embodiments, method 3000 can include a decision block S124 of determining whether the field has been scouted or not. For example, if the problem was just detected and the farmer determines that the field has not been scouted, flow can proceed to a block S126, which directs the flow to a block S200 of FIG. 4, described below. If the field has been scouted, the flow can proceed to a block S128, which can direct the flow to a block S210 of FIG. 4, described below, which can direct the flow back to block S100 to update the image after a problem was scouted and detected.

Figure 4:
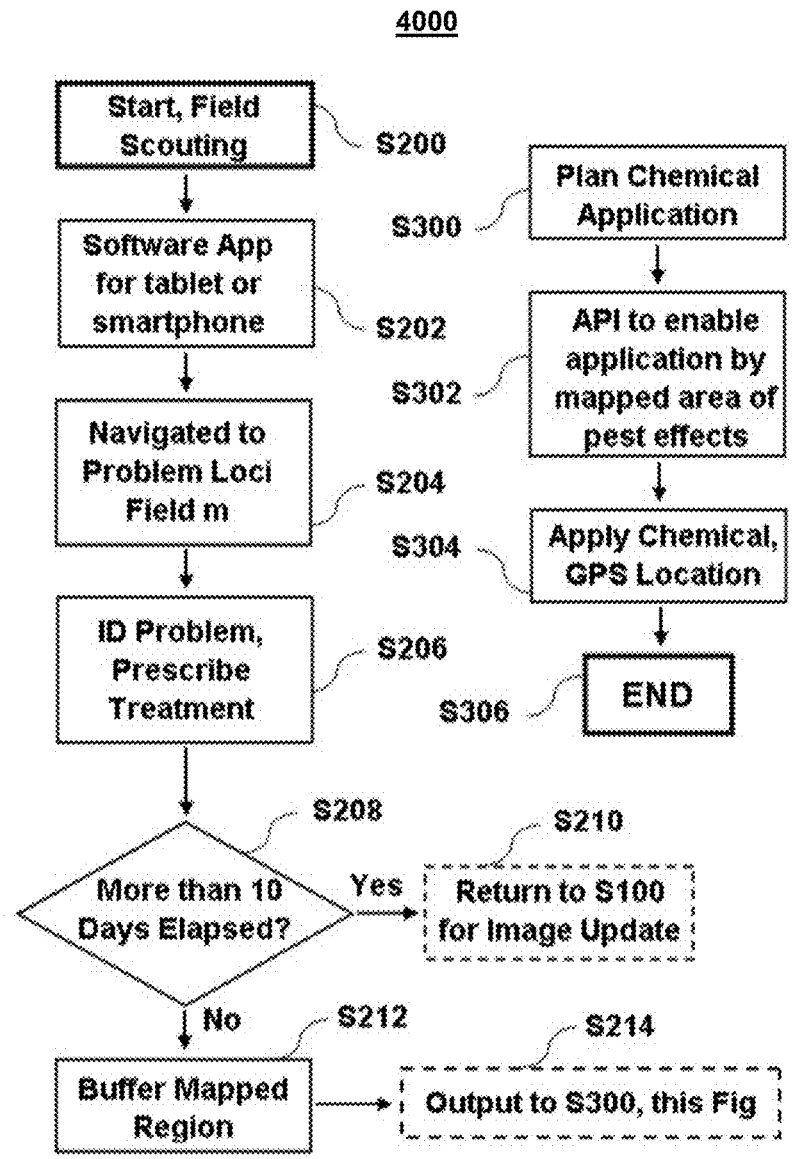
FIG. 4 illustrates a flow chart for a method of field scouting and chemical application, according to an embodiment.

Turning ahead in the drawings, FIG. 4 illustrates a flow chart for a method 4000 of field scouting and chemical application, according to an embodiment. Method 4000 is merely exemplary and is not limited to the embodiments presented herein. Method 4000 can be employed in many different embodiments or examples not specifically depicted or described herein. In some embodiments, the procedures, the processes, and/or the activities of method 4000 can be performed in the order presented. In other embodiments, the procedures, the processes, and/or the activities of method 4000 can be performed in any suitable order. In still other embodiments, one or more of the procedures, the processes, and/or the activities of method 4000 can be combined or skipped. Referring to FIG. 4, method 4000 of field scouting can begin at a block S200 of starting field scouting.

In a number of embodiments, method 4000 next can include a block S202 of presenting the digital map data from block S122 (FIG. 3) on a software app, such as on a handheld device (e.g., a tablet or smartphone). For example, the device can be similar or identical to device 7000 (FIG. 7), described below.

In several embodiments, method 4000 next can include a block S204 of navigating the user (e.g., the scout) to the problem locations for evaluation.

In various embodiments, method 4000 next can include a block S206 of identifying the problem and prescribing a chemical application treatment plan to correct the problem.

In many embodiments, method 4000 next can include a decision block S208 of determining whether a predetermined number of days has elapsed since the last image. For example, the predetermined number of days can be approximately 10 days. If the predetermined number of days has elapsed since the last image, the flow can proceed to block S210, which can direct the flow back to block S100 to update the image after a problem was scouted and detected. If the predetermined number of days has not elapsed since the last image, the flow can proceed to a block S212.

In several embodiments, method 4000 can include block S212 of applying a buffer region. In a number of embodiments, block S212 can apply a mathematical buffer around the most recent cumulative change detection map that was confirmed to harbor biological pests through scouting. In many embodiments, the buffer can add area around the affected zone in order to control for new areas where the biological pest may have spread. In this way, the additional area treated helps to ensure treating the areas of potential spread. The earlier that a problem can be scouted and identified, the smaller the area of such a buffer will be needed. For example, as shown in FIG. 2, the problem can spread over time. Because biological pests spread across fields over time, the added buffered zone placed around low index values can be increased each day after the image was obtained. The rate of expansion can be variable. For example, as shown in FIG. 2, buffering at a rate of 0.5 pixel width per day can safely enclose the area of any pathogen spread for certain types of pests after the initial earliest detection.

In various embodiments, method 4000 of FIG. 4 can continue to a block S214, which can direct the flow to a block S300 for planning and applying a chemical application. In many embodiments, method 4000 can include block S300 of planning for chemical application. For example, conventional planning method can be used employing the buffered map to plan how, and in what pattern, the application will take place. For example, depending upon the field, the crop, and the pest, application can be accomplished using a ground spray rig that runs along the rows of the field delivering the chemical where it has been targeted, or by aerial vehicle making numerous passes over the field.

In some embodiments, method 4000 next can include a block S302 of sending guidance instructions to application equipment of mapped areas for application. For example, GPS enabled spray rigs can be controlled through application program interface (API) calls from the systems and method described herein based on the digital maps and the chemical application plan.

In several embodiments, method 4000 next can include a block S304 of applying the chemical to the field according to GPS control that turns the chemical application on and off according to position and the guidance by the digital map from block S300. At a block S306, the flow can end.

Figure 5:
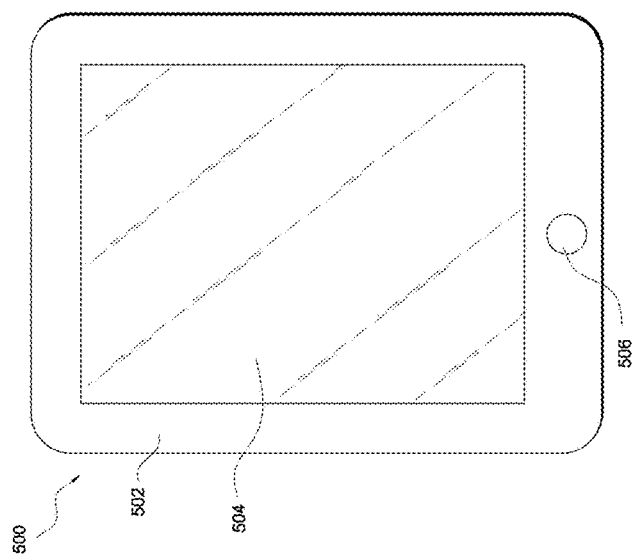
FIG. 5 illustrates a computer that is suitable for implementing the device of FIG. 7.
Figure 6:
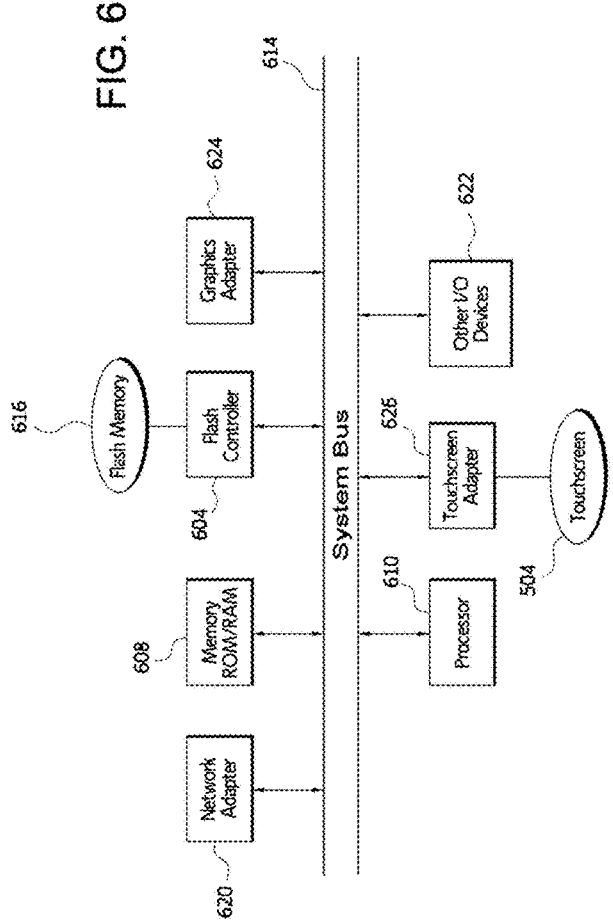
FIG. 6 illustrates a representative block diagram of an example of elements included in circuit boards inside a chassis of the computer of FIG. 5.

Turning ahead in the drawings, FIG. 5 illustrates a tablet computing device 500 that is suitable for implementing device 7000 of FIG. 7, described below. Tablet computing device 500 can include a chassis 502 containing one or more circuit boards (not shown), a touchscreen display 504, and a button 506. A representative block diagram of the elements included on the circuit boards inside chassis 502 is shown in FIG. 6. A processor 610 in FIG. 6 is coupled to a system bus 614 in FIG. 6. In various embodiments, the architecture of processor 610 can be compliant with any of a variety of commercially distributed architecture families.

System bus 614 can be coupled to memory 608, which can include both read only memory (ROM) and random access memory (RAM). In the depicted embodiment of FIG. 6, various I/O devices such as a flash controller 604, a graphics adapter 624, a touchscreen adapter 626, a network adapter 620, and other I/O devices 622 can be coupled to system bus 614. Touchscreen adapter 626 can be coupled to touchscreen 504 (FIGS. 5-6). Flash controller 604 can control flash memory 616.

Although many other components of tablet computing device 500 (FIG. 5) are not shown, such components and their interconnection are well known to those of ordinary skill in the art. Accordingly, further details concerning the construction and composition of tablet computing device 500 and the circuit boards inside chassis 502 (FIG. 5) need not be discussed herein.

When tablet computing device 500 in FIG. 5 is running, program instructions stored in non-transitory memory, such as in flash memory 616 (FIG. 6) or in non-volatile memory 608 (FIG. 6) can be executed by processor 610 (FIG. 6). A portion of the program instructions, stored on these devices, can be suitable for carrying out the methods described herein.

Although tablet computing device 500 is illustrated as a tablet computing device in FIG. 5, in many embodiments the systems and method describe herein can take a different form factor with various functional differences, while still having functional elements similar to those described for tablet computing device 500. In some embodiments, tablet computing device 500 may comprise a single computer, a single server, or a cluster or collection of computers or servers, or a cloud of computers or servers. Typically, a cluster or collection of servers can be used when the demand on tablet computing device 500 exceeds the reasonable capability of a single server or computer.

Figure 7:
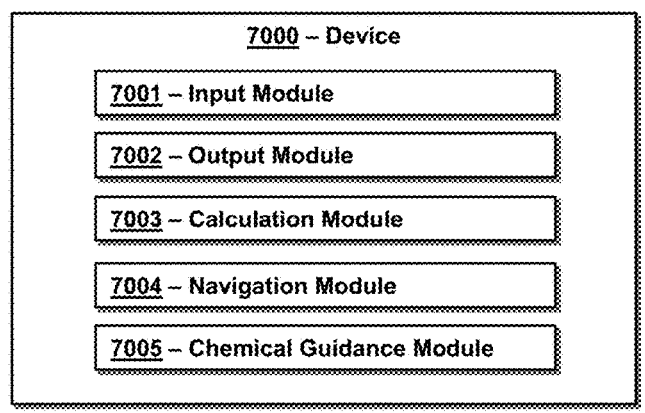
FIG. 7 illustrates a block diagram of a device that is suitable for implementing the methods described herein.

Turning ahead in the drawings, FIG. 7 illustrates a block diagram of a device 7000. Device 7000 and the modules therein are merely exemplary and are not limited to the embodiments presented herein. Device 7000 can be employed in many different embodiments or examples not specifically depicted or described herein. In some embodiments, certain elements or modules of device 7000 can perform various procedures, processes, and/or acts. In other embodiments, the procedures, processes, and/or acts can be performed by other suitable elements or modules. In a number of embodiments, device 7000 can be similar or identical to tablet computing device 500 (FIG. 5), and can run one or more modules. In other embodiments, one or more of the modules can be run on one or more other devices, such as another one of tablet computing device 500 or another type of computer.

In some embodiments, device 7000 can include an input module 7001. In certain embodiments, input module 7001 can receive input, and can at least partially perform block S102 (FIG. 3) of obtaining EOS images, block S206 (FIG. 4) of identifying the problem and prescribing a chemical application treatment plan to correct the problem, and/or block S300 (FIG. 4) of planning for chemical application.

In various embodiments, device 7000 can include an output module 7002. In certain embodiments, output module 7002 can generate and/or display out, and can at least partially perform block S122 (FIG. 3) of outputting the digital maps to the user, and/or block S202 (FIG. 4) of presenting the digital map data.

In a number of embodiments, device 7000 can include a calculation module 7003. In certain embodiments, calculation module 7003 can at least partially perform block S104 (FIG. 3) of processing the images to reflectance values, block S106 (FIG. 3) of extracting scene statistics and calculating NDVI* for the scene, block S108 (FIG. 3) of extracting and determining Field m medians from NDVI* time series images, block S110 (FIG. 3) of entering the Field m medians into the clocking function to forecast AED and when canopy closure will occur, block S112 (FIG. 3) of performing band balancing on the reflectance data, block S114 (FIG. 3) of clipping the balanced band data to the boundaries of Field M, block S116 (FIG. 3) of calculating $K_{TCM}$ using the balanced band data of Field M, block S118 (FIG. 3) of calculating change detection for Field m, block S120 (FIG. 3) of calculating the cumulative $K_{TCM}$ change detection for Field m, and/or block S212 (FIG. 4) of applying a buffer region.

In several embodiments, device 7000 can include a navigation module 7004. In certain embodiments, navigation module 7004 can at least partially perform block S204 (FIG. 4) of navigating the user to the problem locations for evaluation.

In a number of embodiments, device 7000 can include a chemical guidance module 7005. In certain embodiments, chemical guidance module 7005 can at least partially perform block S302 (FIG. 4) of sending guidance instructions to application equipment of mapped areas for application.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, a wide variety of soil amendments and nutrients other than those mentioned above may be employed depending upon the soil and crop in the field. Various delivery methods and mechanical systems may be employed for delivery of the prescribed amendments as determined by the variety of data from various sources as described above. As another example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 3-4 may include different procedures, processes, and/or activities and be performed by many different modules, in many different orders, and/or one or more of the procedures, processes, or activities of FIGS. 3-4 may include one or more of the procedures, processes, or activities of another different one of FIGS. 3-4.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of precisely applying one or more chemicals targeted by one or more digital maps developed from remotely sensed data, the method comprising:

executing one or more first computer instructions configured to obtain earth observation satellite (EOS) data of at least part of a growing season of a crop growing in a field;

executing one or more second computer instructions configured to process the EOS data to first reflectance values;

executing one or more third computer instructions configured to adjust the first reflectance values to be adjusted reflectance values to remove error-inducing effects of atmospheric alteration from the first reflectance values;

executing one or more fourth computer instructions configured to calculate from the adjusted reflectance values a crop performance index that indicates one or more poor performing areas of the field;

executing one or more fifth computer instructions configured to generate one or more maps of the crop performance index, the one or more maps of the crop performance index being configured to allow a user to determine whether at least one of the one or more poor performing areas of the field is performing poorly due to biological pests instead of topographic or soil constraints in discrete locations of the field;

executing one or more sixth computer instructions configured to guide the user to the at least one of the one or more poor performing areas of the field using the one or more maps of the crop performance index to allow the user to scout the at least one of the one or more poor performing areas of the field to confirm the biological pests are present and to identify the biological pests; and executing one or more seventh computer instructions configured to prescribe, based on the biological pests that are identified, a chemical application for the at least one of the one or more poor performing areas;

wherein:

the one or more first computer instructions, the one or more second computer instructions, the one or more third computer instructions, the one or more fourth computer instructions, the one or more fifth computer instructions, the one or more sixth computer instructions, and the one or more seventh computer instructions are programmed to run at one or more processors of a computer system and stored at one or more non-transitory memory storage devices of the computer system.

2. The method of claim 1, further comprising:

executing one or more eighth computer instructions configured to forecast when the field will experience canopy closure;

wherein:

executing the one or more eighth computer instructions comprises:

executing one or more ninth computer instructions configured to process the EOS data of at least a first third of the growing season to determine a normalized difference vegetation index (NDVI) and a modified normalized difference vegetation index (NDVI*); and executing one or more tenth computer instructions configured to perform a clocking function to forecast when to begin calculating the crop performance index;

and the one or more eighth computer instructions are programmed to run at the one or more processors of the computer system and stored at the one or more non-transitory memory storage devices of the computer system.

3. The method of claim 1, wherein:

the one or more maps of the crop performance index comprise at least one of one or more crop performance index maps, one or more crop performance index change detection maps, or one or more cumulative crop performance index change detection maps.

4. The method of claim 1, wherein:

the one or more maps of the crop performance index comprise one or more crop performance index change detection maps;

executing the one or more fifth computer instructions comprises:

executing one or more eighth computer instructions configured to generate the one or more crop performance index change detection maps;

executing the one or more eighth computer instructions comprises:

executing one or more ninth computer instructions configured to generate one or more first crop performance index maps;

executing one or more tenth computer instructions configured to generate one or more updated crop performance index maps; and executing one or more eleventh computer instructions configured to subtract one or more spatially discrete pixels of the one or more first crop performance index maps from the one or more updated crop performance index maps;

and executing the one or more sixth computer instructions comprises:

executing one or more twelfth computer instructions configured to output at least one of the one or more crop performance index change detection maps.

5. The method of claim 1, wherein:

the one or more maps of the crop performance index comprise one or more cumulative crop performance index change detection maps;

executing the one or more fifth computer instructions further comprises:

executing one or more eighth computer instructions configured to generate the one or more cumulative crop performance index change detection maps;

executing the one or more eighth computer instructions comprises:

executing one or more ninth computer instructions configured to generate one or more first cumulative crop performance index maps;

executing one or more tenth computer instructions configured to generate one or more updated cumulative crop performance index maps; and executing one or more eleventh computer instructions configured to add the first cumulative crop index performance maps to the updated cumulative crop performance index maps;
and
executing the one or more sixth computer instructions further comprises:
executing one or more twelfth computer instructions configured to output at least one of the one or more cumulative crop performance index change detection maps.

6. The method of claim 1, wherein:
executing the one or more sixth computer instructions comprises:
executing one or more eighth computer instructions configured to use global positioning system functionality of a mobile device to provide navigation information to the at least one of the one or more poor performing areas;
executing one or more ninth computer instructions configured to record one or more observations regarding the crop at the at least one of the one or more poor performing areas of the field; and
executing one or more tenth computer instructions configured to output the one or more observations and the navigation information.

7. The method of claim 1, further comprising:
before executing the one or more seventh computer instructions, executing one or more eighth computer instructions configured to develop a digital map using the one or more maps of the crop performance index to identify the chemical application;
wherein:
executing the one or more eighth computer instructions comprises:
executing one or more ninth computer instructions configured to determine a first number of days from a first date on which the one or more maps of the crop performance index are created to a second date on which the chemical application is to be applied; and
executing one or more tenth computer instructions configured to buffer the digital map to increase a size of an area to be treated with the chemical application based on the first number of days; and
the one or more eighth computer instructions are programmed to run at the one or more processors of the computer system and stored at the one or more non-transitory memory storage devices of the computer system.

8. The method of claim 7, wherein:
executing the one or more eighth computer instructions further comprises:
when the first number of days is greater than a predetermined threshold, executing one or more eleventh computer instructions configured to obtain new EOS data of the growing season of the crop growing in the field and update the digital map using the new EOS data;
and
executing the one or more tenth computer instructions comprises:
executing one or more twelfth computer instructions configured to buffer the digital map to increase the size of the area to be treated with the chemical application based on a second number of days from a third date on which the digital map is updated to a fourth date on which the chemical application is to be applied.

9. The method of claim 1, wherein:
executing the one or more seventh computer instructions comprises:
executing one or more eighth computer instructions configured to identify chemical spray equipment for the chemical application; and
executing one or more ninth computer instructions configured to communicate to the chemical spray equipment a digital map based at least in part on the one or more maps of the crop performance index.

10. The method of claim 1, wherein:
executing the one or more fifth computer instructions comprises:
executing one or more eighth computer instructions configured to color code and lay the one or more maps of the crop performance index over a high-resolution air photograph.

11. A computer system comprising:
an input module;
an output module;
one or more processors; and
one or more non-transitory memory storage devices storing computer instructions programmed to run on the one or more processors and perform acts comprising:
obtaining earth observation satellite (EOS) data of at least part of a growing season of a crop growing in a field;
processing the EOS data to first reflectance values;
adjusting the first reflectance values to be adjusted reflectance values to remove error-inducing effects of atmospheric alteration from the first reflectance values;
calculating from the adjusted reflectance values a crop performance index that indicates one or more poor performing areas of the field;
generating one or more maps of the crop performance index, the one or more maps of the crop performance index being configured to allow a user to determine whether at least one of the one or more poor performing areas of the field is performing poorly due to biological pests instead of topographic or soil constraints in discrete locations of the field;
guiding the user to the at least one of the one or more poor performing areas of the field using the one or more maps of the crop performance index to allow the user to scout the at least one of the one or more poor performing areas of the field to confirm the biological pests are present and to identify the biological pests; and
prescribing, based on the biological pests that are identified, a chemical application for the at least one of the one or more poor performing areas.

12. The system of claim 11, wherein:
the acts further comprise:
forecasting when the field will experience canopy closure; and
forecasting when the field will experience canopy closure comprises:
processing the EOS data of at least a first third of the growing season to determine a normalized difference vegetation index (NDVI) and a modified normalized difference vegetation index (NDVI*); and performing a clocking function to forecast when to begin calculating the crop performance index.

13. The system of claim 11, wherein:
the one or more maps of the crop performance index comprise at least one of one or more crop performance index maps, one or more crop performance index change detection maps, or one or more cumulative crop performance index change detection maps.

14. The system of claim 11, wherein:
the one or more maps of the crop performance index comprise one or more crop performance index change detection maps;
generating the one or more maps of the crop performance index further comprises:
generating the one or more crop performance index change detection maps;
generating the one or more crop performance index change detection maps comprises:
generating one or more first crop performance index maps;
generating one or more updated crop performance index maps; and
subtracting one or more spatially discrete pixels of the one or more first crop performance index maps from the one or more updated crop performance index maps;
guiding the user to the at least one of the one or more poor performing areas of the field using the one or more maps of the crop performance index to allow the user to scout the at least one of the one or more poor performing areas of the field to confirm the biological pests are present and to identify the biological pests further comprises:
outputting at least one of the one or more crop performance index change detection maps.

15. The system of claim 11, wherein:
the one or more maps of the crop performance index comprise one or more cumulative crop performance index change detection maps;
generating the one or more maps of the crop performance index further comprises:
generating the one or more cumulative crop performance index change detection maps;
generating the one or more cumulative crop performance index change detection maps comprises:
generating one or more first cumulative crop performance index maps;
generating one or more updated cumulative crop performance index maps; and
adding the first cumulative crop index performance maps to the updated cumulative crop performance index maps;
guiding the user to the at least one of the one or more poor performing areas of the field using the one or more maps of the crop performance index to allow the user to scout the at least one of the one or more poor performing areas of the field to confirm the biological pests are present and to identify the biological pests further comprises:
outputting at least one of the one or more cumulative crop performance index change detection maps.

16. The system of claim 11, wherein:
guiding the user to the one or more poor performing areas of the field using the one or more maps further comprises:
using global positioning system functionality of a mobile device to provide navigation information to the at least one of the one or more poor performing areas;
recording one or more observations regarding the crop at the at least one of the one or more poor performing areas of the field; and
outputting the one or more observations and the navigation information.

17. The system of claim 11, wherein:
the acts further comprise:
before providing guidance for the chemical application at the one or more poor performing areas using the one or more maps, developing a digital map using the one or more maps of the crop performance index to identify the chemical application;
and
developing the digital map using the one or more maps of the crop performance index to identify the chemical application comprises:
determining a first number of days from a first date on which the one or more maps of the crop performance index are created to a second date on which the chemical application is to be applied; and
buffering the digital map to increase a size of an area to be treated with the chemical application based on the first number of days.

18. The system of claim 17, wherein:
developing the digital map using the one or more maps of the crop performance index to identify the chemical application further comprises:
obtaining new EOS data of the growing season of the crop growing in the field and updating the digital map using the new EOS data;
and
buffering the digital map to increase the size of the area to be treated with the chemical application based on the first number of days comprises:
buffer the digital map to increase the size of the area to be treated with the chemical application based on the second number of days from the third date on which the digital map is updated to the fourth date on which the chemical application is to be applied.

19. The system of claim 11, wherein:
prescribing, based on the biological pests that are identified, a chemical application for the at least one of the one or more poor performing areas comprises:
identifying chemical spray equipment for the chemical application; and
communicating to the chemical spray equipment a digital map based at least in part on the one or more maps of the crop performance index.

20. The system of claim 11, wherein:
generating the one or more maps of the crop performance index further comprises:
color coding and laying the one or more maps of the crop performance index over a high-resolution air photograph.

* * * * *